United States Patent [19]
Adkison

[11] Patent Number: 5,277,649
[45] Date of Patent: Jan. 11, 1994

[54] METHOD AND APPARATUS FOR REMOVING MEAT FROM POULTRY LEGS AND THIGHS

[75] Inventor: Frank L. Adkison, Columbus Junction, Iowa

[73] Assignee: Systemate Holland B.V., Numansdorp

[21] Appl. No.: 983,890

[22] Filed: Dec. 1, 1992

[51] Int. Cl.$^5$ .............................................. A22C 25/16
[52] U.S. Cl. ..................................... 452/136; 452/138
[58] Field of Search ............... 452/135, 136, 138, 125, 452/127

[56] References Cited

U.S. PATENT DOCUMENTS

| | | | |
|---|---|---|---|
| 4,041,572 | 8/1977 | Martin et al. | 452/136 |
| 4,380,849 | 4/1983 | Adkison et al. | 452/136 |
| 4,669,150 | 6/1987 | Manmoto et al. | 452/136 |
| 4,811,457 | 3/1989 | Lindert | 452/136 |
| 4,993,113 | 2/1991 | Hazenbroek | 452/136 |
| 5,102,369 | 4/1992 | Martin et al. | 452/136 |
| 5,173,076 | 12/1992 | Hazenbroek | 452/135 |

Primary Examiner—Willis Little
Attorney, Agent, or Firm—Hopkins & Thomas

[57] ABSTRACT

Poultry leg and thigh deboner comprising a deboning module (37) carried by a conveyor mechanism along a processing path. The deboning module comprises an upright fixed thigh bone support block (61) and a movable leg bone support block (62). A pair of stripper jaws (73) are provided for grasping the distal end of the leg bone (44) and pushing the meat of the leg bone toward the joint (46) between the leg and thigh bone (42). A slot (68) is provided along the upper edge of the thigh bone support block (61) for holding the thigh bone (49) and pushing the meat of the thigh toward the joint (46) as the thigh bone is pushed through the slot. A hollow meat cutter tube (93) is provided for moving around the leg bone and cutting the meat from the joint (46) after the meat has been pushed to the joint.

30 Claims, 8 Drawing Sheets

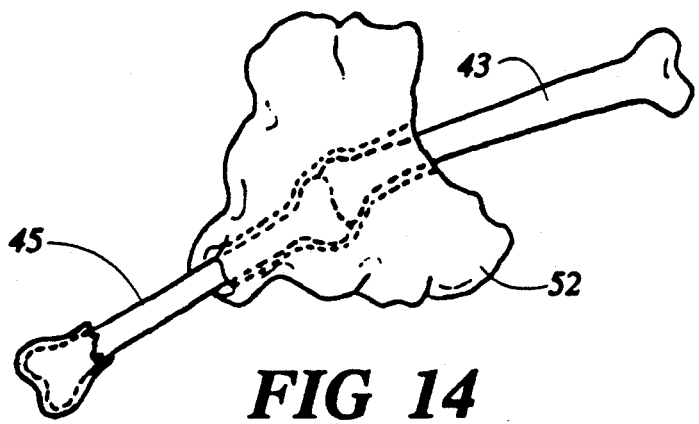
FIG 14
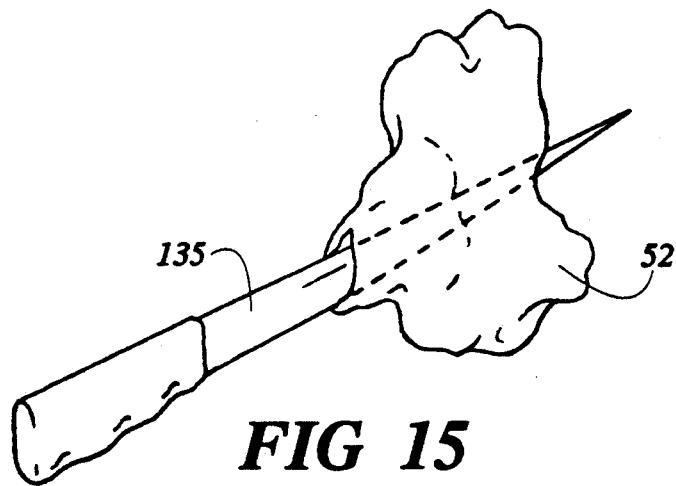
FIG 15
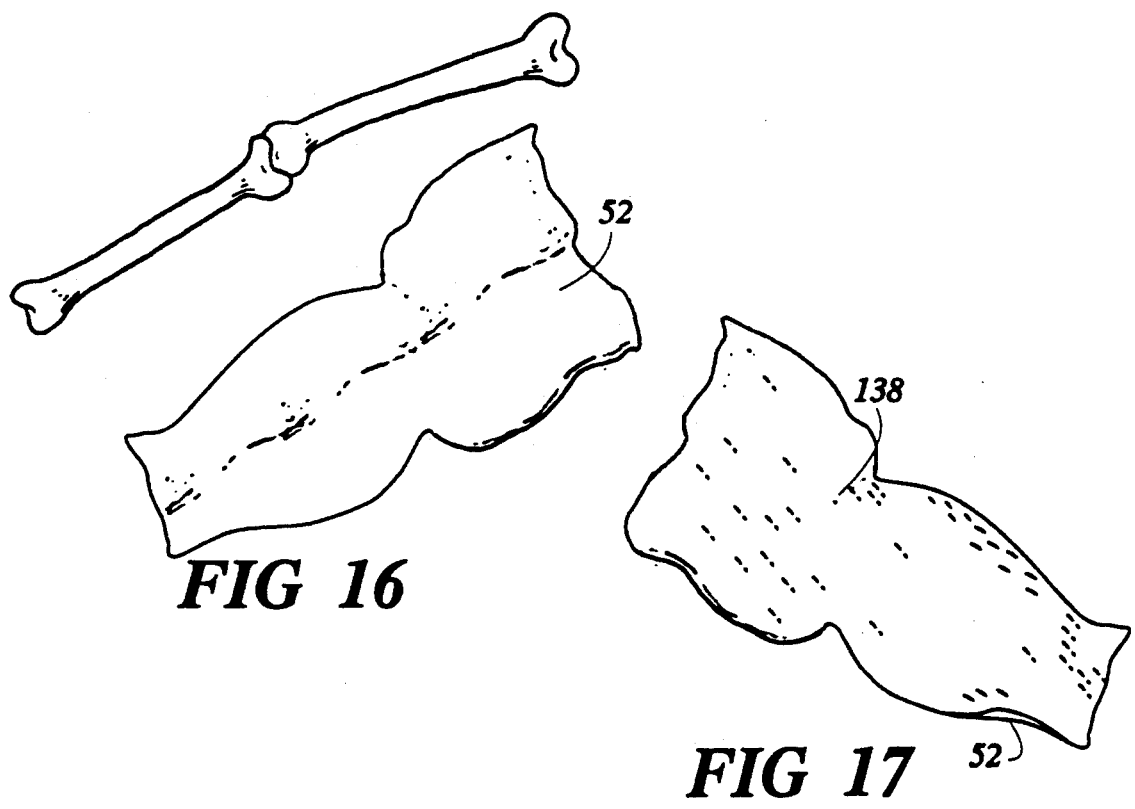
FIG 16
FIG 17

METHOD AND APPARATUS FOR REMOVING MEAT FROM POULTRY LEGS AND THIGHS

FIELD OF THE INVENTION

This invention relates in general to automated machinery for removing meat from the bones of animal parts, such as poultry legs and thighs. More particularly, this invention concerns a method and apparatus for automatically removing the meat from the connected thigh and leg of poultry in one operation to produce a separated single sleeve of meat.

BACKGROUND OF THE INVENTION

In automated poultry processing facilities, the birds are feed through a series of processing stations wherein they are killed, defeathered, eviscerated, and subsequently cut up into component parts for packaging and shipment to market. In the cut up operations of the poultry carcasses, it is a common practice to cut the feet from the legs and then to cut the connected leg and thigh segments from the carcass at the torso. The separated leg and thigh segments can then be cut to produce individual leg and thigh parts, which can be packaged separately, or the meat can be removed from the bones of the leg and thigh for commercial use in preparing soups, meat pies, frozen dinners, and the like. This process of removing the meat from the bones is commonly referred to as a "deboning" process.

In the past, several methods have been developed to debone the legs and thighs of poultry, which methods generally employ some type of scraping tool that engages the bone of a leg or thigh and scrapes along its length. For example, U.S. Pat. No. 4,811,456 discloses a pair of notched scraping blades that closely straddle a bone of the poultry part, such as a thigh, and are moved longitudinally along the length of the bone to progressively scrape the meat from the bone. U.S. Pat. No. 4,488,332 discloses a deboning apparatus comprising a resilient flexible stripping device having a hole therein through which the bone is thrust to pry the meat from the bone. While both of these methods work satisfactorily in deboning a single bone segment, they nevertheless have difficulty in deboning a multi-segmented poultry part, such as a connected leg and thigh.

Consequently, poultry deboning machinery has been developed for deboning connected leg and thigh segments of poultry. For example, U.S. Pat. No. 2,897,536 discloses a poultry deboning machine comprising a pair of opposed rotating meat stripping rolls adapted to strip or pull the meat from the bones from a connected leg and thigh segment as the leg and thigh segment is pulled between the inner section of the two rotating rolls. U.S. Pat. No. 3,261,054 discloses a leg deboning machine comprising a pair of opposed stripper bars that engage the bones of a leg and thigh segment and scrape along the entire length of the connected leg and thigh as the poultry part is pulled past the stripper bars.

What the two foregoing machines, as well as other machines, have in common is that they debone a leg and thigh part by moving a stripper mechanism from one end of the leg and thigh segment to the other. A common problem encountered by attempting to remove the meat from connected leg and thigh segments by this method is that it is difficult to maneuver the stripping mechanism around the enlarged joint connecting the bones. Either the pressure exerted by the stripper mechanism is insufficient to remove all of the meat from the bones, or the pressure is so great that undesirable pieces, such as cartilage, tendons, and ligaments, are removed along with the meat, or the joint is broken by the force and the leg bone is pulled from the thigh bone along with the meat.

In addition, the commercial valve of the meat is enhanced if it can be removed in one large piece with the skin in tact. Such a cut is known as a "Japanese cut", and it is desirable for preparing certain specialty dishes, wherein vegetables are stuffed in the meat and the skin is enveloped around the vegetables for cooking. However, due to the difficulty in maneuvering the stripping device around the enlarged joint without stripping cartilage from the joint, the meat is often separated in several pieces or the skin is ripped or torn.

Moreover, many automated deboning machines require that once the meat is pulled from the bones, that it be cut to separate is completely from the bone. To accomplish this, a cutting device typically is placed adjacent the bone in a position to engage the meat and cut it from the bone after the meat is pulled off of the bone. However, such an automated cutting step often results in undesirable cartilage or tendons getting cut along with the meat.

Accordingly a heretofore unaddressed need exists for an improved method and apparatus for deboning the legs and thighs of poultry to produce a single chunk of meat relatively free of undesirable cartilage or bone fragments with the skin in tact around the meat.

SUMMARY OF THE INVENTION

Briefly described, the present invention comprises a method and apparatus for removing the meat from the legs and thighs of poultry or from other similarly connected animal parts. In a preferred embodiment of the invention, the leg and thigh deboner includes a plurality of deboning modules each mounted on a pair of rigid travel rods that are attached at their ends to a chain conveyor that revolves around pairs of sprockets and carries the deboning modules in series along a substantially endless processing path.

Each deboning module includes a pair of meat stripper mechanisms that support the connected leg and thigh segments in a generally aligned relationship and move along the length of the leg and thigh bones to remove the meat therefrom. Each deboning module includes a thigh bone support block having a slot along its upper edge for receiving therein the distal end of the thigh bone. The thigh bone support block is rigidly connected to the pair of travel rods that extend between the chain conveyors. The deboning modules also include a leg bone support block that is slidably mounted onto the travel rods to move toward and away from the thigh bone support block. The leg bone support block carries a pair of opposed leg bone stripper jaws that pivot toward each other to grasp closely the leg bone.

With the stripper jaws grasping the distal end of the leg bone and with the distal end of the thigh bone held by the slot of the thigh bone support block, the stripping process works as follows. The leg bone support block moves toward the thigh bone support block, causing the stripper jaws to strip the meat off the leg bone and also to push the meat toward the joint between the leg and thigh while the contours of the slot in the thigh bone support block strip the meat off the thigh bone and push the meat toward the joint. As a result, a sleeve of meat remains bunched around and connected to the joint.

The leg bone support block also carries a hollow, cylindrical meat cutter tube that is adapted to move around the leg bone, after the meat has been stripped therefrom, so that the leg bone moves into the hollow tube. The hollow cylindrical meat cutter tube is aligned parallel with the travel rods and, thus, in alignment with the leg and thigh segment upon mounting on the deboning module. The leading edge of the cutter tube has an annular cutting edge that works its way between the meat of the leg and the leg bone and around the joint to cut the sleeve of meat from the joint to leave a disconnected sleeve of meat around the joint, which sleeve of meat still has its skin attached substantially in one piece. The diameter of the annular cutting edge of the tube corresponds generally to the diameter of the enlarged bones at the joint of the leg and thigh bone. Thus, a separate cutting mechanism is provided for cutting the meat around the joint from the mechanism that strips the meat from the smaller diameter bones. Accordingly, a method and apparatus are provided for deboning a leg and thigh segment by pushing the meat from the ends of the two bones toward the center joint, as opposed to pushing the meat from one end of the bones to the other end, and cutting the meat from the joint with a separate cutting mechanism designed specifically for the joint.

A set of cam tracks are provided along the processing path adjacent the chain conveyors, which engage cam followers on the leg bone support block as the deboning modules revolve around the apparatus. The cam tracks and followers actuate the various operative parts of the stripper mechanisms. The chain conveyors carry the deboning modules along an upper run of the processing path along which the leg and thigh segments are loaded into the deboning modules and the meat is separated from the bones by actuation of the meat stripping mechanisms in response to the engagement of the cam followers along the cam tracks. Along the lower run of the processing path, the leg and thigh segments are removed from the deboning modules and the cam mechanisms return the deboning modules to their loading positions for receiving a leg and thigh segment upon returning to the upper run.

The leg and thigh segments have a natural tendency to pivot or fold about each other in one direction when a force is exerted on the distal ends of the segments. As a result, the deboning modules are designed for the leg and thigh segments to be mounted therein so that the natural fold between the leg and thigh segments is upwards. Accordingly, to prevent the leg and thigh segment from folding upwardly, an elongated horizontal guide bar is provided above the deboning modules as they move along the upper run of the processing path. The horizontal guide bar is positioned above the thigh segments just inside of the thigh bone support block. Consequently, as the meat is stripped from the thigh bone, if the leg and thigh segment tend to fold upwardly, the thigh engages the horizontal guide bar and is prevented from folding about the leg.

An elongated inverted U-shaped channel is also provided along the upper run of the processing path to close off the slot in the upper portion of the thigh bone support block so that the thigh bone is securely stabilized during the deboning process. The upper edge of the thigh bone support block moves within the inverted channel or slot of the elongated channel after the leg and thigh segments have been mounted into the deboning module.

Three cam tracks are provided along the processing path for moving the stripper jaws, the leg bone support block, and the meat cutter tube. Along the upper run of the processing path, wherein the meat stripping process occurs, the three cam tracks can together be divided generally into five sections. In the first section, which shall be referred to as the loading section, the leg bone support block is retracted away from the thigh bone support block with the cylindrical meat cutter tube extended away from the stripper jaws. In such a configuration, the leg and thigh segments are loaded into the deboning modules prior to the commencing of the deboning process. In the second section, the three cam tracks angle toward the thigh bone support block in order to move the leg bone support block toward the thigh bone support block. During the second section of the upper run, the cam track for actuating the pair of stripper jaws rises slightly to cause the stripper jaws to grasp the leg bone. Thus, with the distal end of the leg bone securely grasped by the jaws, the movement of the leg bone support block toward the thigh bone support block causes the thigh bone to move through the slot in the upper edge of the thigh bone support block, which causes the meat around the thigh bone to be pushed from the distal end of the thigh bone to the joint between the leg and thigh bone. Also, the resistance of the meat along both bones causes the stripper jaws to move along the length of the leg bone toward the joint and push the meat of the leg around the joint. As a result, a sleeve of meat remains substantially connected to the joint.

During the third section, the three cam tracks straighten out so that neither the leg bone support block nor the meat cutter tube is further actuated. However, the cam track for actuating the stripper jaws returns to its lower level during the third section to release the stripper jaws from the leg bone. During the fourth section, the cam track for actuating the meat cutter tube angles toward the thigh bone support block in order to move the meat cutter tube around the leg bone and the joint to strip the meat from the leg bone. The cam track for actuating the meat cutter tube has teeth along the fourth section to cause a gear wheel follower mounted to the meat cutter tube to rotate, thus causing the meat cutter tube to rotate as it moves around the joint. This rotating action enhances the cutting action of the annular cutting edge of the meat cutter tube.

During the fifth section, the cam track for the meat cutter tube straightens back out, however, a portion of its length has teeth to cause the meat cutter tube to continue rotating to ensure that the meat is completely cut from the bones. Accordingly, at the end of the fifth section of the upper run, the meat of the leg and thigh is bunched up around the joint and is entirely separated therefrom to form a sleeve of meat dangling around the joint.

Along the lower run of the processing path, the meat cutter tube is retracted off of the leg bone and joint, and the deboned leg and thigh segment falls by gravity into a suitable collection bin or onto a secondary conveyor for transport to a subsequent processing station.

The method and apparatus of the present invention removes the meat from the connected leg and thigh bone in a substantially different manner than that of prior art methods and machines. By pushing the meat of the leg and thigh toward the joint therebetween, the present invention avoids having to pull the meat from either the leg or thigh past the enlarged joint therebetween and thus risk leaving some meat segments attached to the bones or risk pulling some cartilage or tendons from the bones along with the meat. In addition, since a separate cutting mechanism is utilized to cut the meat from the joint, a more accurate cut is made so that all of the meat is removed from the bone and the quality of the meat is enhanced because it contains little or no undesirable material.

Accordingly, it is an object of the present invention to provide an improved method and apparatus for reliably and expediently removing the meat from the leg and thighs, as well as from other similarly connected animal parts.

Another object of the present invention is to provide a method and apparatus for separating the meat from both the thigh bone and the leg bone in a single operation.

Another object of the present invention is to provide a method and apparatus for removing meat from leg and thigh bones in an efficient manner to produce a single piece of meat of larger bulk with the skin of the meat in tact.

Another object of the present invention is to provide a method and apparatus that efficiently removes the meat from the legs and thighs and avoids leaving substantial portions of meat attached to the bones and avoids removing cartilage, tendons, and ligaments along with the meat.

Another object of the present invention is to provide a high speed method and apparatus for deboning large quantities of legs and thighs in a rapid and efficient manner that cleanly separates the meat from the bones.

Another object of the present invention is to provide a method and apparatus for cleanly removing the meat from the leg and thigh bones without breaking or splintering the bones, thus reducing the hazard for bone fragments.

Other objects, features, and advantages of the present invention will become apparent upon reading the following detailed description when taken in conjunction with the accompanying drawings.

BRIEF DESCRIPTION OF THE DRAWINGS

FIG. 14 is a perspective view of the leg and thigh segment after it has by the poultry leg and thigh deboner of FIG. 1.

FIG. 15-17 illustrate the sequence of steps performed by a operator on the sleeve of meat surrounding the poultry leg and thigh of FIG. 14.

DETAILED DESCRIPTION

Figure 1:
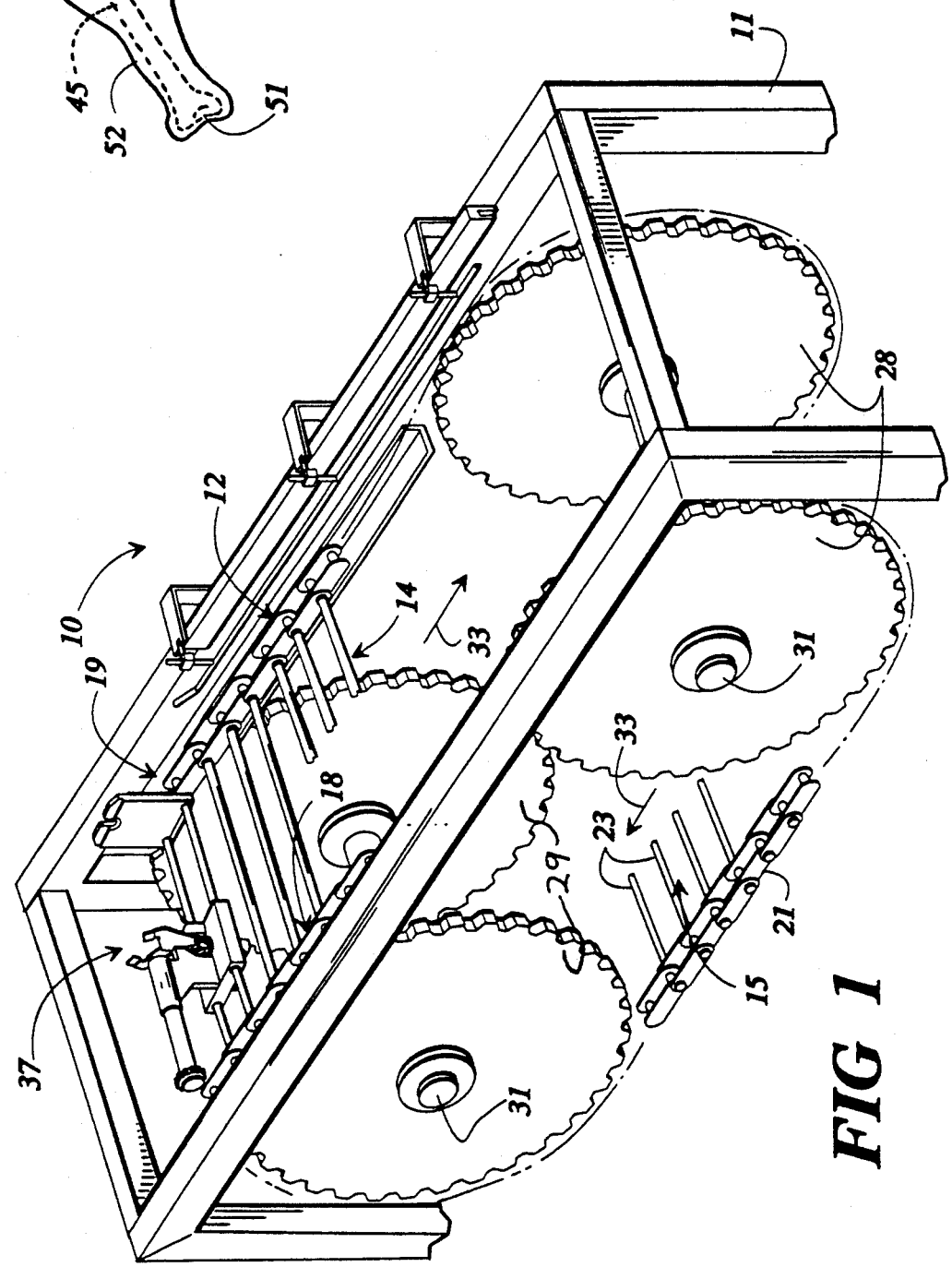
FIG. 1 is a perspective view of the poultry leg and thigh deboner.

Referring now in more detail to the drawings, in which like numerals represent like parts throughout the several views, FIG. 1 is a perspective view of the poultry leg and thigh deboner 10 constructed in accordance with a preferred embodiment thereof. The poultry leg and thigh deboner 10 includes a support frame 11, which preferably is formed from suitably connected metal structural members such as channels, angle irons, etc. The frame 11 serves to support the several operating components of the machine hereinafter described, preferably at such height as to place such components of the machine at a suitable level for convenient loading of leg and thigh segments by an operator and unloading of deboned leg and thigh segments onto a suitable secondary conveyor positioned below the apparatus.

The poultry leg and thigh deboner 10 comprises an endless conveyor mechanism 12 having an upper run 14 and a lower run 15. The conveyor mechanism 12 is conventional and well known in the art and includes a pair of chain conveyors 18,19, which each include a plurality of linkages 21 attached together in series to form substantially endless moving chains. Pairs of travel rods 23 are attached at their ends to the links 21 of the chain conveyors 18,19. As shown in FIG. 1, each of the chain conveyors 18,19 extend longitudinally from one end of the frame 11 to the other end, revolving about pairs of sprockets 28,29. The sprockets of each pair are connected by a axle 31 that is rotatably mounted to suitable structural members of frame 11. A suitable drive means (not shown) is coupled to one or both of the axles 31 for propelling the conveyor mechanism 12 along a processing path 33.

The pairs of travel rods 23 each carry a deboning module 37 along the endless processing path 33. Together, the chain conveyors and travel rods attached thereto function as a conveyor means for carrying the deboning modules along the processing path.

In general, an operator loads the leg and thigh parts into the deboning modules as the modules move along the upper run 14 of the conveyor, and the leg and thigh parts are deboned along the upper run 14. As the deboning modules carry the leg and thigh parts down to the lower run 15, the leg and thigh parts fall by gravity onto a suitable secondary conveyor (not shown), which carries the deboned leg and thigh parts to a subsequent processing station.

Figure 2:
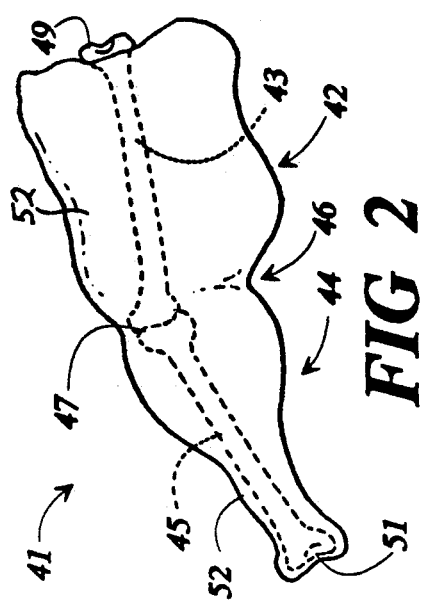
FIG. 2 is a schematic illustration of a connected poultry leg thigh segment.

FIG. 2 is an enlarged view of a poultry leg and thigh part 41 that consists of a thigh 42 including a thigh bone 43, a leg 44 including a leg bone 45, and a joint 46 connecting the thigh bone 43 to the leg bone 45 at the adjacent ends thereof. Also shown at the joint 46 are a set of tendons, ligaments, and cartilage, collectively indicated at 47. The distal end 49 of the thigh bone and the distal end 51 of the leg bone are slightly exposed by the meat 52 surrounding the leg and thigh bones. The distal ends 49,51 of the leg and thigh bones are also slightly larger than the interior or middle portions of the bones, as are the adjacent ends of the leg and thigh bones at the joint 46. Thus, the diameters of the interior or middle portions of the leg and thigh bones are smaller than the diameters of the ends of the bones.

Figure 3:
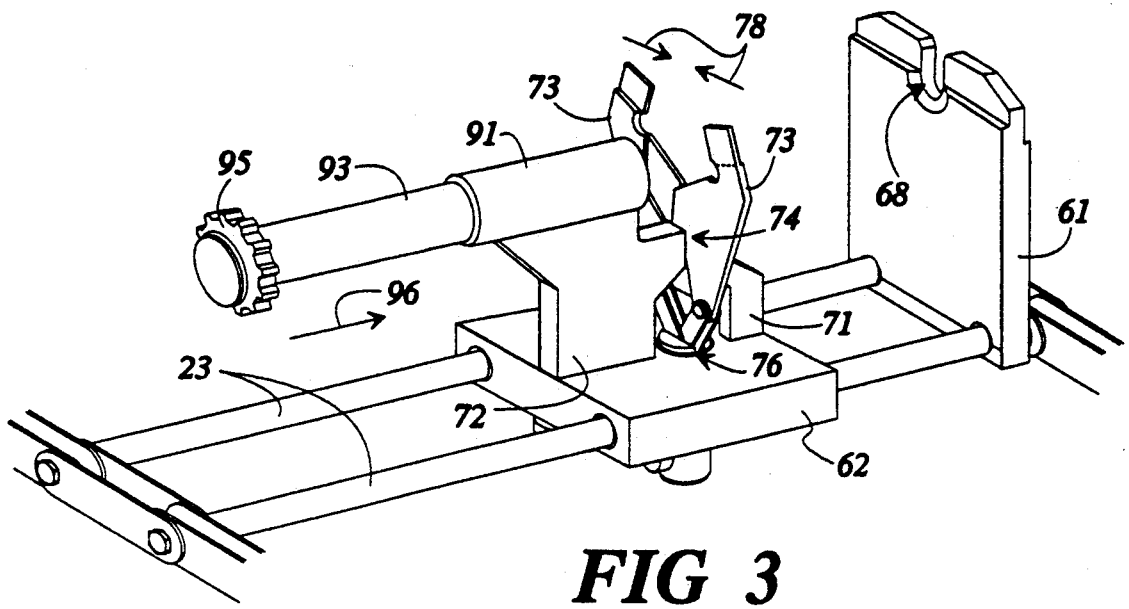
FIG. 3 is an enlarged perspective view of a deboning module of leg and thigh deboner of FIG. 1.
Figure 4:
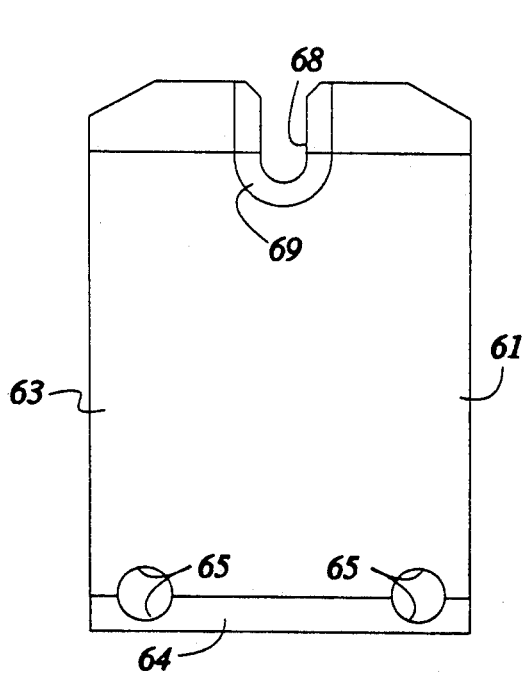
FIG. 4 is an enlarged side elevation view of the upright thigh bone support block of the deboning module of FIG. 3.

FIG. 3 illustrates a deboning module 37 in greater detail. The deboning module 37 comprises a fixed upright thigh bone support block 61 that is rigidly secured to a pair of travel rods 23, and a movable leg bone support block 62 that is slidably mounted on the pair of travel rods 23. Referring momentarily to FIG. 4, the thigh bone support block 61 comprises two pieces 63,64 having grooves 65 adapted to conform to the diameter of the travel rods 23 (not shown). The two pieces 63,64 of the thigh bone support block 61 are secured together by suitable means (not shown). The upper edge of the thigh bone support block 61 includes a slot 68 with a beveled edge 69. The width of the slot 68 is dictated by the diameter of the middle portion of a poultry thigh bone, the slot 68 being adapted to receive closely the thigh bone therein.

Referring back to FIG. 3, the movable leg bone support block 61 carries a forward support arm 71 and an aft support block 72 between which are pivotally mounted a pair of leg bone stripper jaws 73. The leg bone stripper jaws 73 are pivotally mounted between the support arm 71 and the support block 72 at 74. An actuating mechanism 76 is coupled to the stripper jaws 73 to cause the jaws to open and close in the direction indicated by arrow 78.

Figure 5:
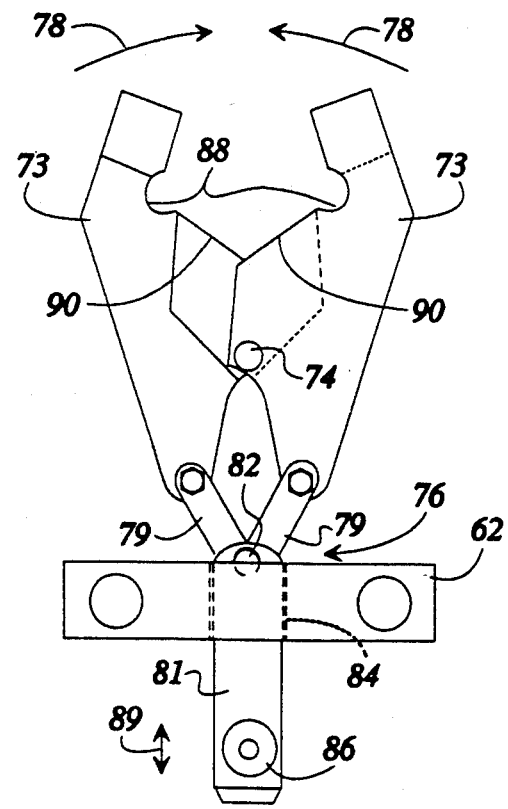
FIG. 5 is an enlarged detailed view of the leg bone stripper jaws assembly of the deboning module of FIG. 3.

Referring momentarily to FIG. 5, the stripper jaw actuating mechanism 76 includes a pair of linkages 79 pivotally connected at their upper ends to the stripper jaws 73 and pivotally connected at their lower ends to a vertical actuating rod 81 at 82. The vertical actuating rod 81 extends through an opening 84 within the leg bone support block 61 and below the support block where a cam roller 86 is rotatably secured to the side of the lower end of the actuating rod 81. The cam roller 86 moves within a cam track fixedly secured along the processing path and discussed later. The stripper jaws 73 each include a semicircular groove 88, which are adapted to mate to form a circular opening upon the jaws pivoting toward one another. The stripper jaws 73 also each include a shelf 90 that together form a ledge upon which the distal end of the leg bone can be mounted during the loading operation. As the deboning modules are revolved along the processing path, the cam roller 86 is caused to move up and down as indicated by arrow 89, which causes the pivot 82 at the upper end of the actuating rod 81 to rise, which in turn causes the stripper jaws 73 to pivot in the direction indicated by arrow 78 and grasp the leg bone within the grooves 88.

Referring back to FIG. 3, a cylindrical sleeve 91 is mounted atop support block 72 and is aligned generally with the travel rods 23. A hollow, cylindrical meat cutter tube 93 slidably moves within the support sleeve 91. A geared cam wheel 95 is mounted to the aft end of the meat cutter tube 93. The geared cam wheel 95 rides along a cam track (not shown) that is fixedly secured to the frame of the apparatus. The cam track causes the meat cutting tube 93 to move toward the meat stripper jaws 73, as indicated by arrow 96, as the modules move along the processing path.

Figure 6:
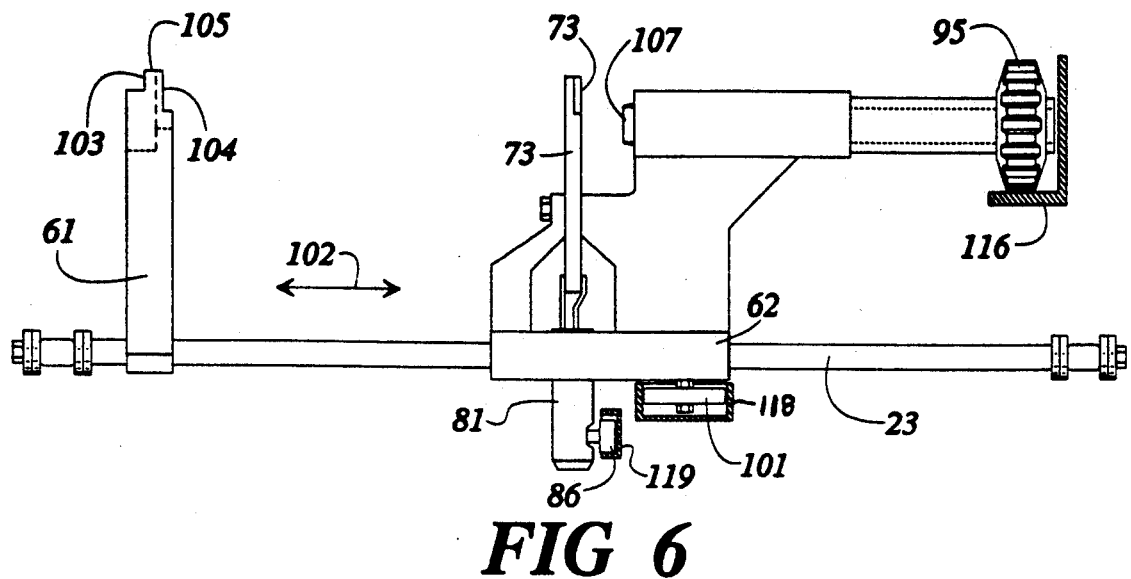
FIG. 6 is an enlarged side elevation view of the deboning module of FIG. 3.

FIG. 6 is a side elevation view of the deboning module 37 of FIG. 3. A cam wheel 101 is rotatably mounted horizontally underneath the leg bone support block 62. The cam wheel 101 rides along a cam track 118 that is fixedly secured to the frame of the apparatus. Cam track 118 causes the leg bone mounting block 62 to move toward and away from the thigh bone support block 61 in the direction indicated by arrow 102. The leading edge 107 of the meat cutter tube 93 has an annular cutting edge for cutting the meat from the joint connecting the bones. The diameter of annular cutting edge corresponds to the enlarged diameters of the ends of the bones. The upper portions of the stripper jaws 73 are off-set from one another to allow the stripper jaw 73 to surround completely the leg bone once the bone is mounted between the jaws and the jaws are closed. Also shown in FIG. 6 are the cam track 116 for actuating the meat cutter tube 93 and the cam track 119 for actuating the stripper jaws 73. The cam roller 86 mounted at the lower end of the stripper jaw actuating rod 81 is oriented in an upright position to ride in a U-shaped cam track 119. Cam track 119 rises and lowers along the length of the processing path to lift the actuating rod 81 and thereby cause the strippers jaws 73 to close about the leg bone of the poultry part. The upper portion of the thigh bone support block 61 includes a pair of milled notches 103,104 that create and upper extension 105 of the support block, which allows the support block 61 to be stabilized by a support channel, as discussed later.

Figure 7:
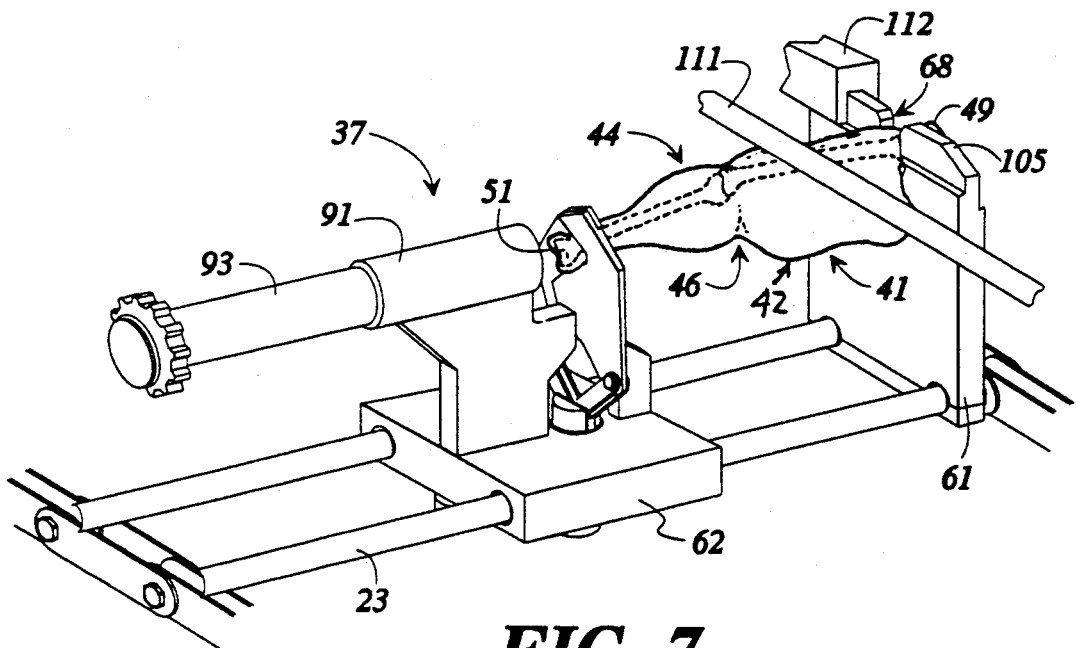
FIG. 7 is the perspective view the deboning module of FIG. 3 shown with a leg and thigh segment loaded into the deboning module.

FIG. 7 illustrates the deboning module of FIG. 3 with a leg and thigh part 41 mounted into the deboning module 37. The distal end 49 of the thigh bone is mounted into the slot 68 of the thigh bone support block 61, and the distal end 51 of the leg bone is grasped between the stripper jaws 73. In this position, the leg and thigh part 41 is ready to be deboned.

It should be noted that the leg and thigh segments of poultry, as well as other animals, tend to pivot or fold about each other in one direction. In order to prevent the thigh 42 and the leg 44 from folding about each other as the leg and thigh are deboned, an elongated horizontal guide bar 111 is provided along the upper run of the processing path. The guide rod 111 is fixedly mounted to the frame of the apparatus. In order for the guide bar 111 to function properly, it is necessary that the leg and thigh part 41 be mounted between the thigh bone support clamp 61 and the pair of stripper jaws 73 so that if the thigh 42 and the leg 44 do tend to pivot or fold, the joint 46 between the leg and the thigh moves upward. With the leg and thigh part 41 so oriented in a deboning module, the guide bar positioned above the thigh bone 42 can function to maintain the leg and thigh bone in a substantially aligned relationship.

To close off the upper side of the slot 68 and, thus, prevent the thigh bone from flipping out of the slot 68 during deboning, an elongated, inverted, U-shaped clamping channel 112 is fixedly mounted to the frame of the apparatus and positioned above the upper portion 105 of the thigh bone support block 61. The clamping channel 112 is sized to fit closely around the upper portion 105 of the thigh bone support block and mate therewith so that, as the deboning modules move along the processing path, the distal end 49 of the thigh 42 is fully enclosed or surrounded and, thus, securely held in place so that it can not flip out of the slot 68.

Figure 8A:
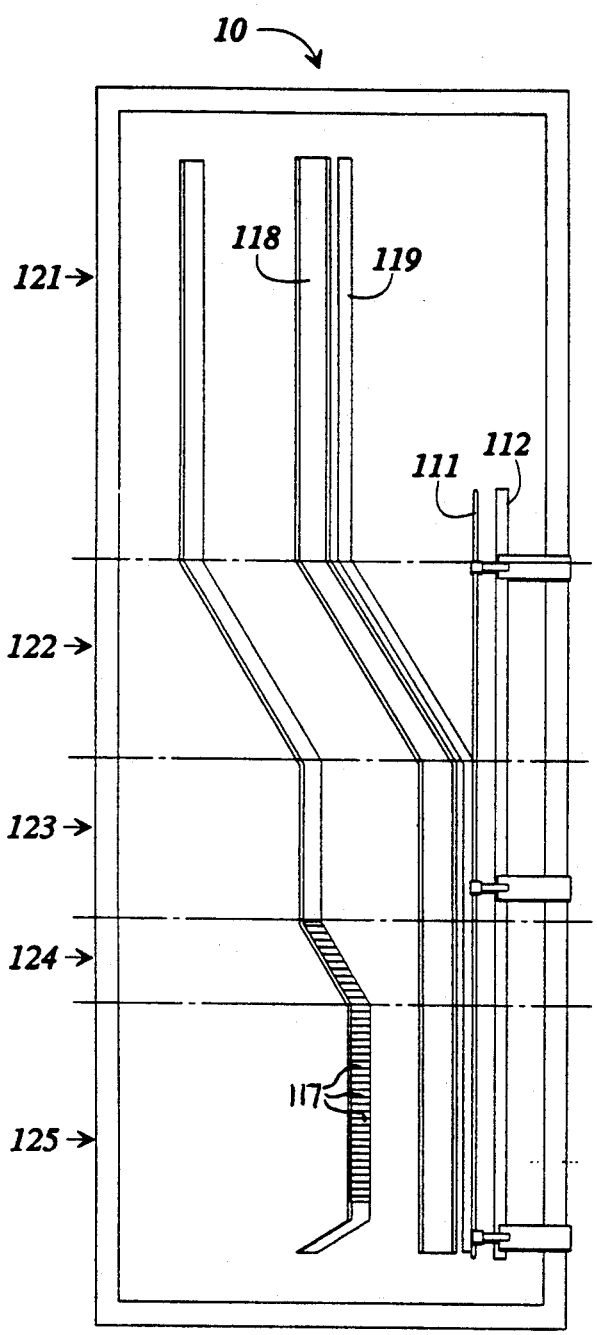
FIG. 8A is a plan view of the poultry leg and thigh deboner of FIG. 1 shown with the conveyor system and the deboning modules removed so that the cam tracks that actuating the operable parts of the deboning modules are clearly illustrated.

FIG. 8A is a plan view of the poultry leg and thigh deboner 10 with the conveyor mechanism and deboning modules not illustrated in order to highlight the cam tracks that actuate the movable components of the deboning modules. The three previously mentioned cam tracks are provided along the upper run of the conveyor mechanism and extend around to the lower run of the conveyor mechanism to form endless cam tracks around the processing path 33. As shown in FIG. 8A, the far left cam track is the meat cutter tube cam track 116 along which rides the geared cam wheel mounted at the end of the meat cutter tube of each deboning module. The meat cutter tube cam track 116 has teeth 117 along a portion of its length to cause the geared cam wheel of the meat cutter tube to rotate as the deboning modules move along the processing path. The middle cam track 118 is the cam track along which rides the horizontal cam wheel mounted below the leg bone mounting block. The third cam track 119 is the cam follower track along which rides the cam follower of the actuating mechanism for the stripper jaws. Also shown in FIG. 8A are the guide bar 111 for maintaining the leg and thigh in alignment throughout the deboning process and the inverted U-shaped clamping channel 112 that holds the thigh bone within the thigh bone support block.

The upper run of the processing path 33 can generally be divided into five sections, as indicated by the dashed lines extending transversely to the processing path. The first section is referred to as the loading section 121 during which the poultry leg and thigh parts are loaded into the deboning modules as the deboning modules move through this section. The second section 122 is referred to as the deboning section during which both the leg and thigh are deboned. The middle cam track 118, which moves the leg bone support block, angles toward the slotted channel 112 into close proximity therewith in order to cause the meat stripping process to occur. The upper guide bar 111 and the slotted channel 112 extend from just prior to the deboning section along substantially the rest of the upper run of the processing path. In the third section 123, the three cam tracks straighten out parallel with the processing path. During the fourth section 124, which shall be referred to as the joint cutting section, the cam track 116 for actuating the meat cutter tube angles toward the slotted channel 112. This causes the meat cutter tube to move around the leg bone and around the joint causing its leading cutting edge to cut the meat from the joint. During the fifth section 125 the cam track 116 for actuating the meat cutter tube straightens back out parallel with the other cam tracks and within the processing path. The teeth 117 along cam track 116 extend for a portion of the length along cam track 116 within section 125 to cause the meat cutter tube to continue rotating as it cuts the meat from the joint.

Figure 8B:
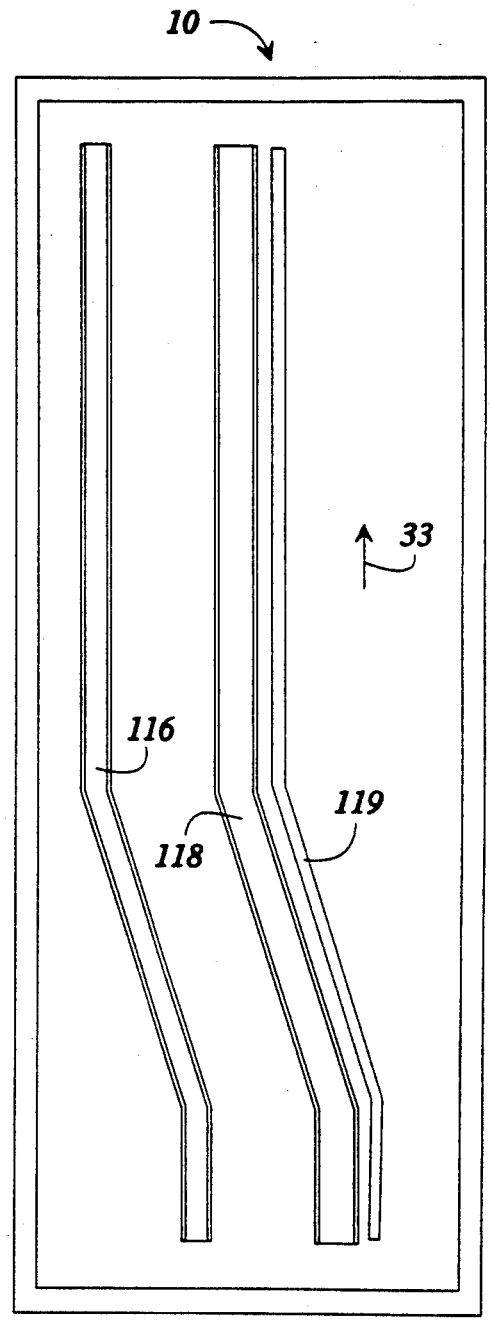
FIG. 8 is a bottom view of the poultry leg and thigh deboner of FIG. 1 illustrating the cam tracks along the underside of apparatus.

FIG. 8B is a bottom view of the apparatus illustrating the configuration of cam tracks 116,118,119 along the bottom of the apparatus. At the end of the lower run of the processing path 33, the cam tracks have returned to their position corresponding to the loading section 121 of the upper run.

Figure 9:
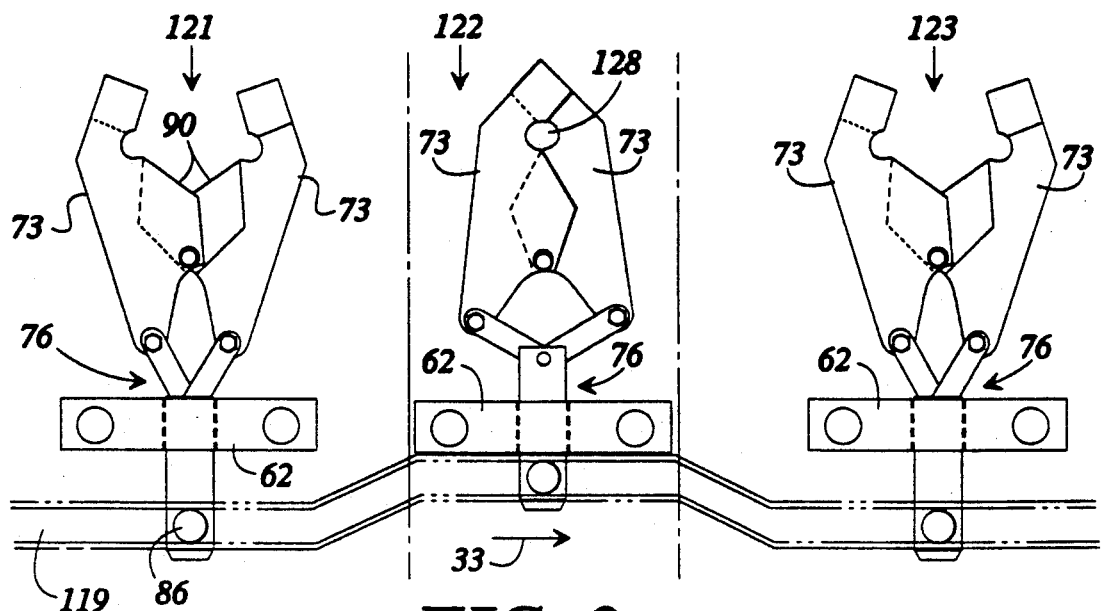
FIG. 9 is a schematic illustration of a sequence of movements of the leg bone stripper jaws assembly as it moves along cam track.

FIG. 9 illustrates schematically a portion of the upper run of the processing path 33 comprising the end of the loading section 121, the entire deboning section 122, and the beginning of the third section 123. Illustrated are side elevation views of the stripper jaws 73 and there actuating assemblies 76. During the loading section 121, the cam track 119 for actuating the stripper jaws is at its lower level position. The stripper jaws 73 are retracted away from one another, which allows an operator to mount the distal end of a leg bone onto the shelf 90 formed by the stripper jaws. Just prior to the stripper jaws moving into the deboning section 122, the cam track 119 rises to an upper level, which lifts the actuating rod 81, causing the connecting linkages 79 to pivot upwards and pivot the stripper jaws 73 toward each other. In this position, the stripper jaws form a circular opening 128 that is sized to fit closely around the smaller diameter of the interior portion of the leg bone. At the beginning of the third section 123, the cam track 119 returns to its lower level position, which causes the stripper jaws to retract away from each other, as they were in the loading section 121.

Figure 10:
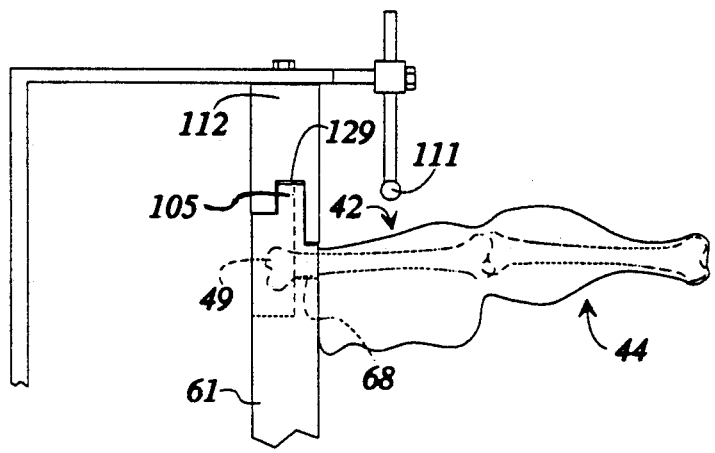
FIG. 10 is an enlarged detailed view illustrating the engagement of the upper portion of the thigh bone support block and the slotted channel, as well as the engagement of upper guide bar with the thigh.

FIG. 10 is a detail view of the engagement of the thigh bone support block 61 with the clamping channel 112. The upper extension 105 of the thigh bone support block 61 is received within the slot 129 formed on the underside of the clamping channel 112. This arrangement closes off the top portion of the slot 68 when the modules move beneath the clamping channel in order to prevent the thigh bone 43 from flipping out of the slot 68. Also shown if FIG. 10 is the elongated upper guide bar 111 and its proximity to the thigh bone support block 61. As is illustrated, should the thigh 42 pivot upwards during the deboning process, the upper guide bar 111 engages the upper side of the thigh and, thus, prevents the thigh from folding upward about the leg.

Figure 11:
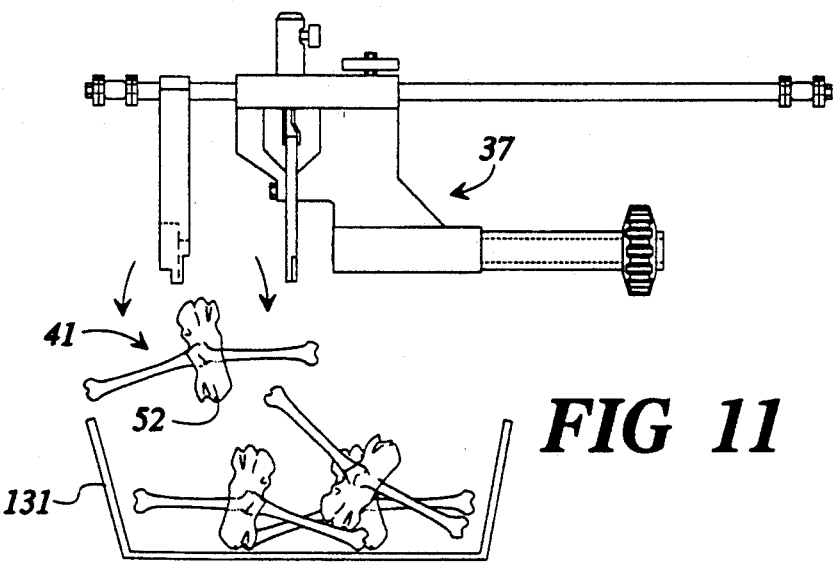
FIG. 11 is a side view of an inverted deboning module along the lower run of the poultry leg and thigh deboner of FIG. 1.

FIG. 11 is a side view of the underside of the poultry leg and thigh deboner illustrating a deboning module 37 in an inverted position along the lower run of the processing path. When the deboning module reaches the lower run and becomes inverted, the deboned leg and thigh 41 falls by gravity into a suitable collection bin or secondary conveyor 131 for transport to subsequent processing stations.

IN OPERATION

Figure 12A:
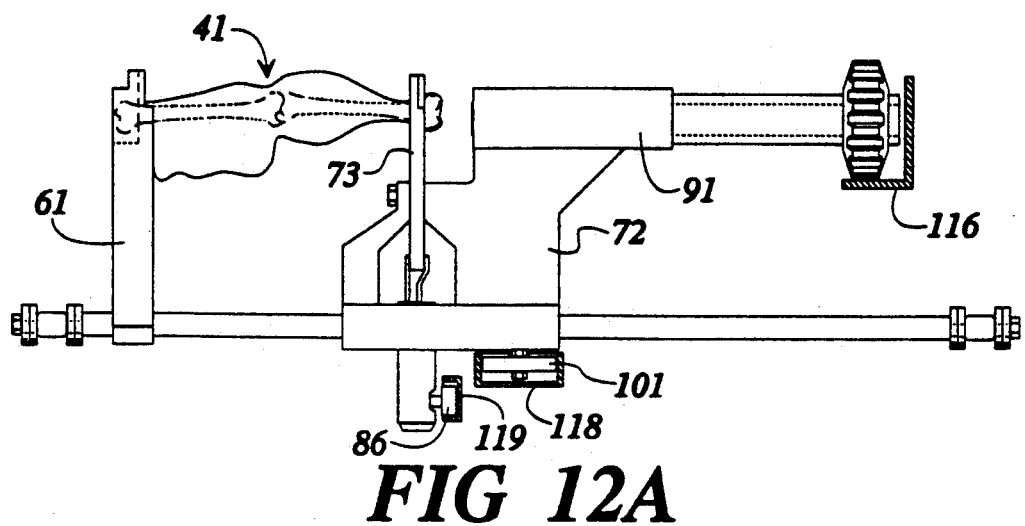
FIG. 12A-12C are side elevation views of the debonding modules of FIG. 3.

FIGS. 12A through 12C and FIG. 13 illustrate the sequence of deboning steps as they occur along the upper run of the processing path. FIG. 12A illustrates a deboning module 37 loaded with a poultry leg and thigh 41 as the module enters the deboning section 122 illustrated in FIG. 13. The leg bone support block 62 is retracted away from the thigh bone support block 61, and the cam track 119 for actuating the stripper jaws 73 is in its lower position so that the stripper jaws are retracted away from each other to allow the thigh and leg to be mounted into the module. The cam followers 95, 101, and 86 are guided by the cam tracks 116,118,119, respectively. The meat cutter tube 93 is retracted rearwardly from the support sleeve 91 mounted to the support block 72 carried by the leg bone support block 62.

Figure 12B:
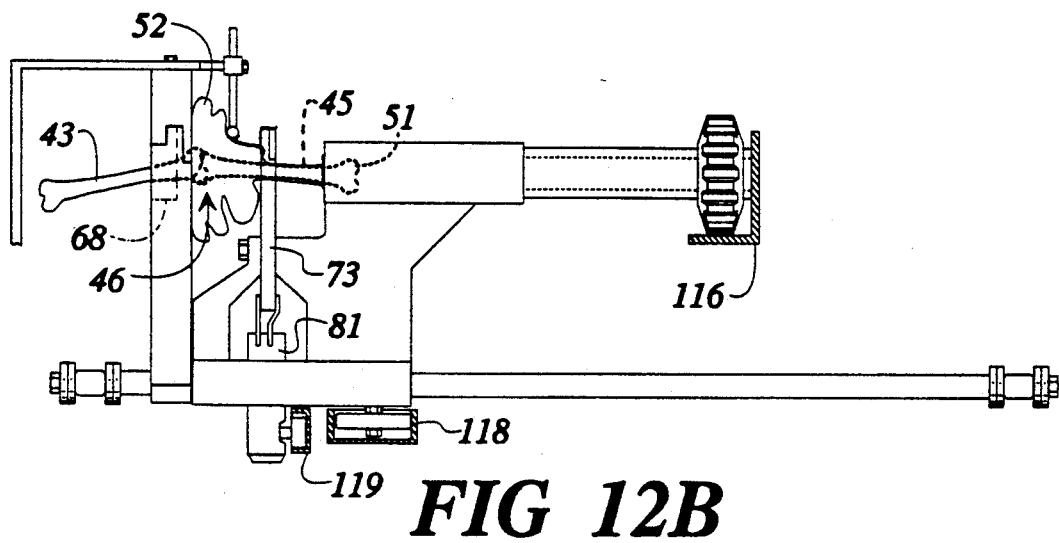

FIG. 12B illustrates the leg and thigh deboning process of section 122. The three cam tracks 116,118,119 have angled toward the thigh bone support block 61, and the cam track 119 has risen to its upper level, which lifts the stripper jaw actuating rod 81 causing the stripper jaws 73 to grasp the leg bone 45 adjacent the distal end 51 of the bone. During the leg and thigh deboning process, the stripper jaws 73 are moved along the length of the leg bone 45 up to the joint 46, which urges the thigh bone 43 through the slot 68 in the thigh bone support block 61, thus pushing the meat of the thigh to the joint 46. Thus, during the deboning process, the slot in the thigh bone support block functions as a thigh bone stripper means and pushes the meat of the thigh toward the joint 46. Also, the stripper jaws function as a leg bone stripper means and push the meat of the leg toward the joint so that a sleeve of meat remains bunched around the joint. The duel action of pushing the meat along the thigh bone toward the joint as well as pushing the meat along the leg bone toward the joint causes the meat to bunch around the joint with only a portion of the meat still connected to the enlarged bone sections of the joint. In addition, the skin around the meat is kept substantially in tact by pushing the meat together toward the joint. During this deboning process, should the leg and thigh tend to fold upward about each other, the upper guide rod 111 is positioned to engage the thigh and hold the leg and thigh generally in alignment.

Figure 12C:
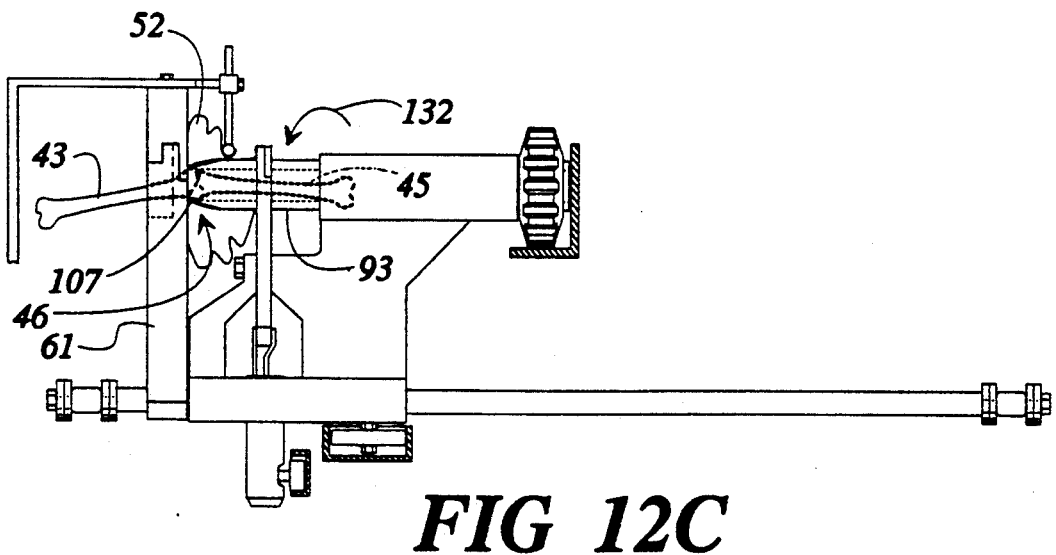
Figure 13:
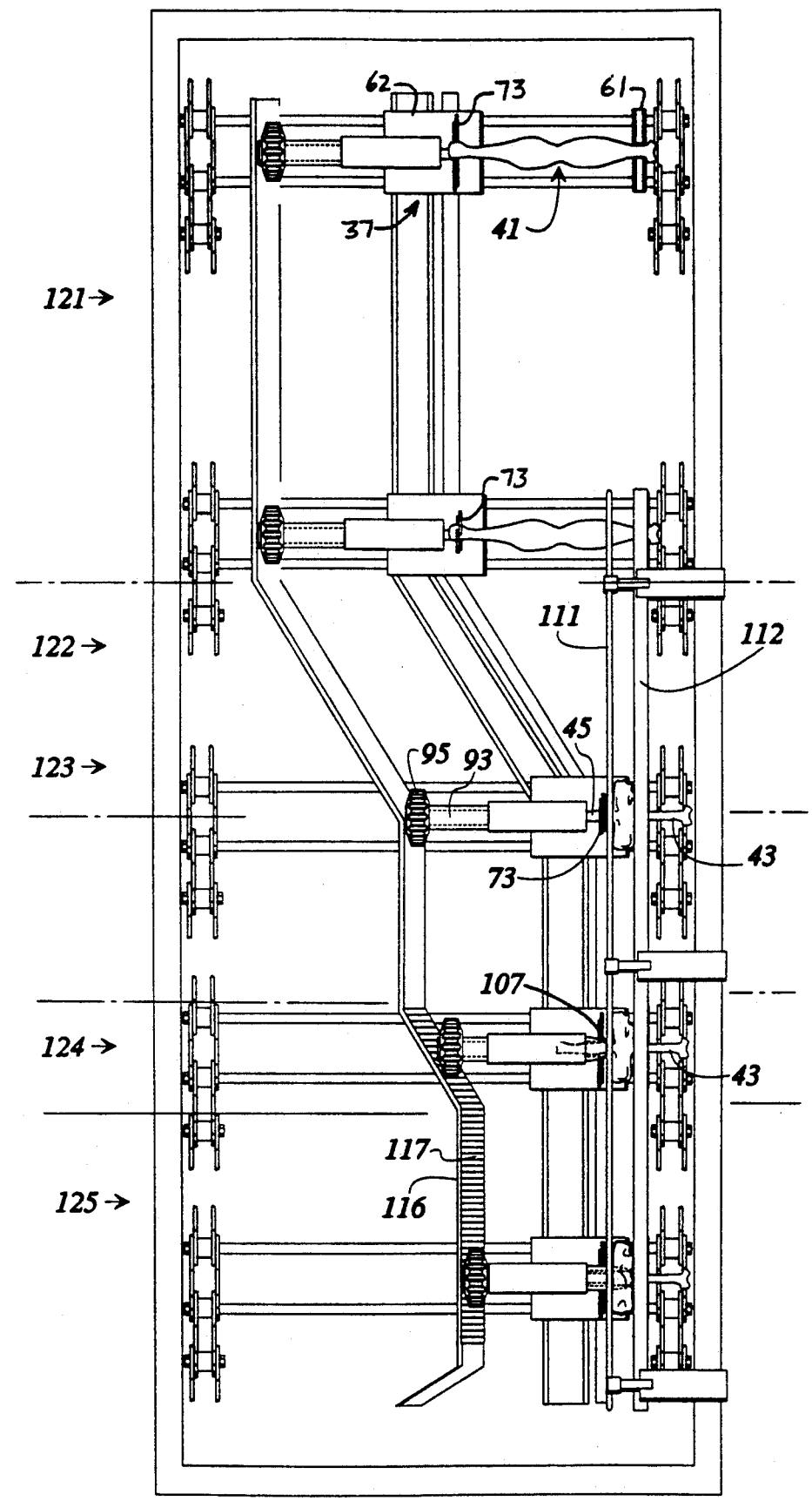
FIG. 13 is a plan view of the poultry leg and thigh deboner of FIG. 1.

FIG. 12C illustrates the meat cutter tube 93 moving around the leg bone 45 and around the joint 46 to cut the chunk of meat 52 surrounding the joint. As shown in FIG. 12C and FIG. 13, during the joint cutting section 124, the teeth 117 along the cam track 116 cause the geared cam wheel follower 95 to rotate as the deboning modules 37 move through sections 124 and 125. This causes the meat cutter tube 93 to rotate, as indicated by arrow 132 in FIG. 12C. The rotation of the meat cutter tube 93 enhances the cutting action of its annular cutting edge 107. As shown in FIG. 12C, the annular cutting edge 107 of the meat cutter tube 93 advances up to the face of the thigh bone support block 61. This ensures complete separation of the meat 52 from the joint 46. Accordingly, the thigh bone support block 61 functions also as a backstop against which the meat cutter tube 93 can act as it cuts the meat from the joint.

At the end of section 125, the meat along both the thigh bone and leg bone has been pushed around the joint and the resulting sleeve of meat has been cut from the joint to produce a separated sleeve of meat around the bones of the leg and thigh 41. Along the lower run of the processing path, the meat cutter tube is retracted off of the bones by the action of cam track 116 and the geared cam wheel follower 95. After the meat cutter tube retracts off of the bones, the deboned leg and thigh parts fall by gravity onto a secondary conveyor where they are collected and carried to subsequent processing stations.

FIG. 14 illustrates a deboned leg and thigh part 41 with a sleeve of meat 52 generally around the joint 46 yet substantially separated therefrom. At a subsequent processing station, an operator can slide the sleeve of meat 52 off of the leg bone 45 or thigh bone 43, and insert a knife 135, as shown in FIG. 15, into the hollow cavity between the meat and cut a segment of the meat to produce a flat piece of meat as illustrated in FIG. 16.

Is should be noted that the process as described herein strips the meat from the leg bone and thigh bone with the skin around the meat substantially intact. As shown in FIG. 17, the skin 138 remains around the meat 52 in one piece so that the final product can be packaged as such and sold at a premium price. Such a cut is known as a Japanese cut, a cut that is desirable in preparing specialty dishes wherein for example, vegetables are stuffed into the meat and the meat and skin are wrapped around the vegetables, pinned, and cooked so that the juices of the vegetables soak into the meat.

The features and principles of the present invention have been illustrated in the foregoing description of a preferred embodiment thereof. It will be apparent to those skilled in the art that numerous changes or modifications may be made thereto without departure from the spirit and scope of the invention.

I claim:

1. A method of removing the meat from end to end articulating bones of an animal part, such as the connected leg and thigh of a bird, which animal part includes a first bone, a second bone, and an intermediate joint formed at the adjacent ends of the bones, said method comprising the steps of:

maintaining the first and second bones in an unfolded, generally aligned relationship, moving the meat surrounding the first bone progressively along the length of the first bone toward the joint, moving the meat surrounding the second bone progressively along the length of the second bone toward the joint to produce a sleeve of meat around the joint, and moving the sleeve of meat along one of the bones until the meat is removed from the bones.

2. The method of claim 1, and further including the step of cutting the sleeve of meat to separate it from the joint prior to removing the sleeve of meat from the bones.

3. The method of claim 1, wherein the step of moving the meat surrounding the first bone comprises moving first meat stripper means and the first bone relative to each other to separate the meat of the first bone therefrom.

4. The method of claim 3, and wherein the step of moving the meat surrounding the second bone comprises moving second meat stripper means and the second bone relative to each other to separate the meat therefrom.

5. The method of claim 4, wherein the step of moving the first bone relative to the first meat stripper means includes moving the first bone and the first meat stripper means relative to each other along the direction of alignment of the first bone and second bone.

6. The method of claim 5, wherein the step of moving the second bone relative to the second meat stripper means includes moving the second bone and the second meat stripper means relative to each other along the direction of alignment of first and second bones.

7. The method of claim 6, wherein the step of moving the first bone and first stripper means relative to each other and the step of moving the second bone and the second stripper means relative to each other comprise moving the first bone past the first stripper means so that the first stripper means moves along the length of the first bone from its distal end to the joint between first and second bone and moving the second meat stripper means from the distal end of the second bone to the joint between the first and second bone.

8. The method of claim 1, wherein the first bone and second bone are pivotally connected, and further comprising the step of engaging the animal part as the meat is removed therefrom to prevent the first bone and second bone from folding with respect to each other.

9. The method of claim 2, wherein the step of cutting the sleeve of meat from the joint includes advancing a hollow, cylindrical tube with an annular cutting edge at one end thereof around the joint and between the bones and the sleeve of meat.

10. The method of claim 9, wherein the step of cutting the sleeve of meat from the joint includes providing a backstop adjacent the joint against which the cutting edge of the hollow, cylindrical tube can act to cut the sleeve of meat from the joint.

11. The method of claim 9, wherein the step of advancing a hollow, cylindrical tube includes rotating the tube as it advances to enhance the cutting action of the cutting edge past the joint.

12. The method of claim 1, and further comprising the step of cutting through the sleeve of meat to produce an open portion of meat.

13. A method of removing the meat from the connected bones of a leg and thigh of a bird, the leg bone and thigh bone including a joint at their adjacent ends, comprising the steps of:
   supporting the distal ends of the thigh bone and leg bone with meat stripper means, so that the thigh bone and leg bone are aligned with respect to each other,
   moving the meat stripper means toward the joint and along the length of the leg and thigh to separate the meat from the bone, and
   as the meat stripper means and the leg and thigh move with respect to each other, maintaining the leg and thigh generally in alignment as the meat is separated from the bones.

14. The method of claim 13, wherein the thigh bone and leg bone are pivotally connected together to fold about each other in a first direction, and wherein the step of maintaining the thigh and leg in alignment comprises providing a guide member adjacent the thigh to engage the thigh and prevent the thigh and leg from folding in the first direction.

15. A method of removing the meat from the bone of a poultry part, comprising the steps of:
   mounting one end of the poultry part in a slotted support clamp adapted to receive closely the bone,
   mounting the opposite end of the poultry part in a second support clamp;
   moving the slotted support clamp along a processing path and past a slotted channel adapted to receive closely the slotted support clamp and close off slot of the slotted support clamp and thereby completely enclose the bone adjacent the end of the poultry part, and
   as the slotted support clamp moves along the processing path, moving said second support clamp toward the slotted support clamp to push the bone through the slot of the slotted support clamp and to retain the meat at one side of the second support thereby separating the meat from the bone.

16. The method of claim 15, wherein the poultry part comprises a second bone connected at a joint to the first bone, and wherein the step of moving the poultry part toward the slotted support clamp includes moving a meat stripper means from along the length of the second bone toward the joint so that the first bone moves through the slot of the slotted support clamp and meat is pushed along both the first and second bone toward the joint.

17. The method of claim 16, and further comprising the step of cutting the meat around the joint to separate the meat from the.

18. An apparatus for removing meat from the connected bones of a leg and thigh of a bird, the leg bone and the thigh bone being connected at a joint, comprising:
   a conveyor means,
   a plurality of deboning modules carried along a processing path by the conveyor means,
   the deboning modules each including thigh bone stripper means and leg bone stripper means for supporting the leg and thigh in alignment with each other and removing the meat from the bones,
   means for moving the thigh past the thigh bone stripper means and the leg bone stripper means along the length of the leg towards the joint
   the meat of the thigh is pushed from the distal end of the thigh bone towards the joint, and the meat of the leg is pushed to the joint and a sleeve of meat remains generally around the joint.

19. The apparatus of claim 18, and further comprising cutting means for cutting the sleeve of meat from the joint.

20. The apparatus of claim 19, wherein the cutting means includes a hollow cylindrical tube with an annular cutting edge at one end thereof, the hollow cylindrical tube being moveable around the leg bone and along its length with the annular cutting edge adapted to cut the meat from the joint.

21. The apparatus of claim 20, and further comprising means for rotating the hollow cylindrical tube as it cuts the sleeve of meat from the joint.

22. The apparatus of claim 18, and further comprising alignment means along the processing path for maintaining the thigh and leg generally in alignment with respect to each other as the thigh bone stripper means and the leg bone stripper means remove the meat from the bones.

23. The apparatus of claim 22, wherein the alignment means comprises a guide rod positioned adjacent the leg and thigh and adapted to engage the thigh should the leg and thigh fold about each other.

24. The apparatus of claim 19, wherein the thigh bone stripper means includes a support block including a slot at its upper edge portion for closely receiving therein the distal end of the thigh bone and further comprising a slotted channel along the processing path for receiving therein the upper edge portion of the support block to close off the slot and completely surround the thigh bone as the deboning modules are carried along the processing path.

25. An apparatus for removing meat from end to end articulating bones of an animal part, such as the connected leg and thigh of a bird, which includes a first bone, a second bone and an intermediate joint formed at the adjacent ends of the bones, comprising,
   support means for mounting the animal part with the first bone and second bone substantially aligned,
   first bone stripper means for progressively moving the meat of the first bone from the distal end thereof to the intermediate joint,
   second bone stripper means for progressively moving the meat of the second bone from its distal end to the intermediate joint,
   whereby, upon stripping the meat from the first bone and second bone, a sleeve of meat remains generally around the intermediate joint.

26. The apparatus of claim 25, and further comprising cutting means for cutting the sleeve of meat from the joint.

27. The apparatus of claim 26, wherein the cutting means includes a hollow cylindrical tube with an annular cutting edge at one end thereof, the hollow cylindrical tube being moveable around one of the first and the second bones and around the joint length with the annular cutting edge adapted to cut the meat from the joint.

28. The apparatus of claim 27, and further comprising means for rotating the hollow cylindrical tube as its cutting edge cuts the meat from the joint.

29. The apparatus of claim 25, and further comprising means along the processing path for maintaining the first bone and second bone in alignment with respect to each other as the meat is separated from the bones.

30. The apparatus of claim 25, wherein the first bone stripper means includes a support block including a slot at its upper edge portion for closely receiving therein the distal end of the first bone and further comprising a slotted channel along the processing path for receiving therein the upper edge portion of the support block to close off the slot and completely surround the first bone.

* * * * *